United States Patent Office 3,637,846
Patented Jan. 25, 1972

3,637,846
CARBOSTYRIL DERIVATIVES
Janis Plostnieks, Philadelphia, Pa., assignor to McNeil Laboratories, Inc.
No Drawing. Original application Mar. 30, 1967, Ser. No. 626,982. Divided and this application Mar. 27, 1970, Ser. No. 24,472
Int. Cl. C07c 103/30
U.S. Cl. 260—558 P     1 Claim

ABSTRACT OF THE DISCLOSURE

The compounds herein are 3,4-dihydro-4-methyl-4-phenyl-6-chloro-carbostyril derivatives, useful for their various pharmacological activities, such as anti-inflammatory, hypotensive and central nervous system depressant activities. Also included herein is 4'-chloro-$\beta$-methyl-cinnamanilide, useful in the synthesis of the subject carbostyrils.

---

This is a divisional application of my co-pending application Ser. No. 626,982, filed Mar. 30, 1967, now U.S. Pat. 3,575,981.

This invention relates to novel carbostyril derivatives and, more particularly, to certain 3,4-dihydro-4-methyl-4-phenyl-6-chloro-carbostyrils and the preparation thereof. These novel compounds may be structurally represented as follows:

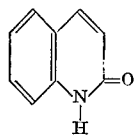

(I)

wherein R is a member selected from the group consisting of hydrogen, lower alkyl, cyano-lower alkyl, amino-lower alkyl, di-(lower alkyl)amino-lower alkyl, carbamoyl-lower alkyl, lower alkyl-carbamoyl-lower alkyl, ureido-lower alkyl, carboxy-lower alkyl, lower alkoxy-carbonyl-lower alkyl, aralkoxy-carbonyl-lower alkyl and carboxylic acyl. The subject compounds are derivatives of carbostyril, also known as 2-quinolone, a colorless material of M.P. 199° C. which may be represented by the structural formula:

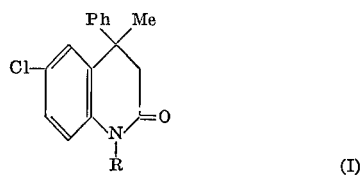

As used herein, lower alkyl and lower alkoxy may be straight or branch chained saturated aliphatic hydrocarbons having from 1 to about 6 carbon atoms, such as, for example, methyl, ethyl, propyl, isopropyl, butyl, tertiary-butyl, pentyl, hexyl and the like alkyls, and the corresponding alkoxys such as methoxy, ethoxy, propoxy, isopropoxy, etc. The term carboxylic acyl includes aliphatic, aromatic and heterocyclic acyls, such as, for example, lower alkylcarbonyls, e.g., acetyl propionyl, butyryl and the like; arylcarbonyls, e.g., benzoyl and substituted benzoyls such as trifluoromethyl benzoyl, halobenzoyl and the like; aralkyl carbonyls, e.g., phenylacetyl, diphenylacetyl and the like; and heterocyclic acyls, e.g., furoyl, thenoyl and the like. The preferred aralkoxy is benzyloxy.

The compound of Formula I, wherein R is hydrogen, may be prepared by the cyclization of 4'-chloro-$\beta$-methyl-cinnamanilide with an appropriate cyclizing agent such as, for example, concentrated sulfuric acid, polyphosphoric acid and the like.

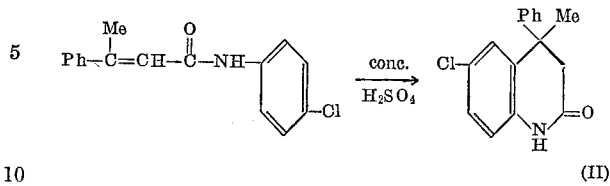

(II)

The compound, 4'-chloro-$\beta$-methyl-cinnamanilide, is believed to be new and, accordingly, constitutes an additional feature of this invention. It is prepared by an acylation type reaction between $\beta$-methyl-cinnamoyl chloride and p-chloroaniline.

Introduction of a lower alkyl, cyano-lower alkyl, di-(lower alkyl)-amino-lower alkyl, lower alkoxy-carbonyl-lower alkyl, or aralkoxy-carbonyl-lower alkyl in the 1-position of the carbostyril nucleus, i.e., onto the ring nitrogen of the N-unsubstituted compound of Formula II, may be accomplished by conventional alkylation techniques with appropriate alkylating agents, for example, with a lower alkyl halide, e.g., methyl iodide, ethyl bromide, butyl bromide and the like; or with a cyano-lower alkyl halide (i.e., by means of cyanoalkylation), e.g., chloroacetonitrile, bromo-butyronitrile and the like; or with a dialkylaminoalkyl halide, e.g., dimethylaminoethyl chloride, diethylaminopropyl chloride and the like; or with a lower alkoxy-carbonyl-lower alkyl halide, e.g., ethoxy-carbonyl-methyl bromide, methoxy-carbonyl-propyl chloride and the like; or with an aralkoxy-carbonyl-lower alkyl halide, e.g., benzyloxy-carbonyl-methyl bromide, benzyloxy-carbonyl-ethyl chloride and the like; respectively. In general, a preferred alkylation procedure comprises preparing the alkali metal salt of the N-unsubstituted compound of Formula II, for example, by the action of an alkali metal amide or hydride, and then treating the thus-obtained salt with the appropriate alkylating agent. The use of an alkali metal alkoxide, e.g., potassium t-butoxide, may be employed in certain cases to prepare the alkali metal salt. The alkylation may be carried out in a variety of polar or nonpolar solvents such as ethers, e.g., tetrahydrofuran, 1,2-dimethoxyethane (monoglyme) and the like; dimethylformamide; or aromatic hydrocarons, e.g., benzene, toluene, xylene and the like. Elevated temperatures may be advantageously employed to accelerate the rate of reaction.

Introduction of a cyanoethyl group in the 1-position of the carbostyril nucleus may be accomplished by conventional cyanoethylation procedures employing acrylonitrile.

By reducing the cyano function of the N-cyanoalkyl compounds of Formula I, the corresponding N-aminoalkyl derivatives are obtained. The reduction is preferably carried out in an organic solvent, e.g., a lower alkanol, with catalytically activated hydrogen, e.g. hydrogen activated by a palladium or nickel catalyst, such as, for example, palladium on carbon, Raney nickel and the like.

Partial hydrolysis of the cyano function affords the corresponding 1-carbamoylalkyl derivatives of 3,4-dihydro-4-methyl - 4 - phenyl-6-chloro-carbostyril. Base hydrolysis in the presence of hydrogen peroxide may be advantageously employed, although acid hydrolysis is preferred, for example, by treatment with concentrated sulfuric acid in glacial acetic acid and subsequently reacting the mixture with water. Complete hydrolysis affords the corresponding 1-carboxyalkyl derivatives of this invention.

Alternatively, the subject 1-carboxyalkyl-3,4-dihydro-4-methyl-4-phenyl-6-chloro-carbostyrils may be obtained by debenzylation of the corresponding 1-benzyloxycarbonylalkyl derivatives. Debenzylation is accomplished by conventional techniques, for example, by means of hydrogen activated by a palladium on carbon catalyst under pressure in an organic solvent such as absolute ethanol.

Transformation of the cyano-lower alkyl group in the 1-position of the subject 3,4-dihydro-4-methyl-4-phenyl-6-chloro-carbostyril into a lower alkyl-carbamoyl-lower alkyl group is accomplished under Ritter reaction conditions, e.g., by treating the former with a tertiary lower alkanol in the presence of concentrated sulfuric acid in glacial acetic acid.

Treatment of the subject 1-aminoalkyl-3,4-dihydro-4-methyl-4-phenyl-6-chloro-carbostyrils in the form of a mineral acid salt with an alkali metal cyanate, e.g., potassium cyanate, in a polar solvent such as water or aqueous alkanol affords the corresponding 1-ureidoalkyl derivatives of this invention.

Acylation of the unsubstituted carbostyril ring nitrogen permits the introduction of an acyl group in which the attaching carbon atom is a carbonyl, e.g., lower alkylcarbonyl, arylcarbonyl, aralkylcarbonyl, heteroaroyl and the like. Such acylation is accomplished by first treating the compound of Formula II with a strongly basic nonhydroxylic agent such as an alkali metal hydride, e.g., sodium hydride, lithium hydride and the like, to form the corresponding carbostyril alkali metal salt, and then intimately contacting said salt with the appropriate acylating agent, such as an acid halide, preferably the chloride, e.g., a lower alkylcarbonyl halide such as acetyl chloride, butyryl chloride and the like, an arylcarbonyl halide such as benzyl chloride, p-trifluoromethylbenzoyl chloride and the like, and other carboxylic acid halides such as phenylacetyl chloride, furoyl chloride, thenoyl chloride and the like, in an anhydrous nonhydroxylic organic solvent medium. The anhydride of a lower aliphatic acid, e.g., acetic anhydride, propionic anhydride, n-butyric anhydride and the like, may also be advantageously used as the acylating agent when introduction of a lower alkyl-carbonyl is desired. Among the organic solvents operable herein are the dialkylformamides, e.g., dimethylformamide, diethylformamide and the like, aromatic hydrocarbons, e.g., benzene, toluene, xylene, chlorobenzene and the like, and ethers such as tetrahydrofuran, 1,2-dimethoxy-ethane and the like. Other strong bases that may advantageously be utilized in lieu of the preferred alkali metal hydrides are alkali metal amides, e.g., sodamide, lithium amide and the like. After reaction periods ranging from a few hours to a few days, the acylated product is extracted and purified according to conventional techniques, e.g., by suitable organic solvent extraction or by column chromatographic techniques.

The compounds of Formula I, wherein R is other than hydrogen, in tests on animals have been found to possess useful pharmacological properties. For example, in doses of 30–100 mg./kg. of body weight, ataxia is observed in mice after intraperitoneal (i.p.) administration of those compounds wherein R is a non-basic function, e.g., lower alkyl, cyano-lower alkyl, carbamoyl-lower alkyl, ureido-lower alkyl, lower alkoxy-carbonyl-lower alkyl, aralkoxy-carbonyl-lower alkyl and carboxylic acyl, and, preferably, when R is methyl, butyl, cyanomethyl, cyanopropyl, carbamoyl-methyl, 2-ureido-ethyl, benzyloxy-carbonyl-methyl and benzoyl. When R is lower alkyl-carbamoyl lower alkyl, a general decrease in motor activity is observed, for example, with R equal to t-butyl-carbamoyl-propyl at i.p. doses of about 100 mg./kg. body weight. Ataxia as well as a decrease in motor activity are used as indications for CNS depression.

With those compounds of Formula I having a basic R substituent such as amino-lower alkyl and di-(lower alkyl)amino-lower alkyl, e.g., 2-aminoethyl, 4-aminobutyl, 2-dimethylaminoethyl and the like, a hypotensive effect is observed in anesthetized dogs after intravenous administration of 1–16 mg./kg. body weight.

The compounds wherein R is an acidic substituent, i.e., carboxy-lower alkyl, are useful as anti-inflammatory agents as judged by their ability to inhibit kaolin induced edema in the rat paw. For example, when R is carboxymethyl, a 44% inhibition is observed after oral administration of about 100 mg./kg. body weight.

In view of the aforementioned pharmacological activities, the compounds of Formula I, wherein R is other than hydrogen, can be administered in therapeutic dosages in conventional pharmaceutical formulations, for example, for oral and parenteral administration.

The subject compound, wherein R is hydrogen, is useful as the starting material in the syntheses of the other compounds of Formula I. Such syntheses are demonstrated in the following examples, which examples are intended to illustrate, but not to limit, the scope of the present invention.

EXAMPLE I

4'-chloro-$\beta$-methylcinnamanilide (25.9 g., 0.096 mole) is suspended in 105 ml. of concentrated sulfuric acid at room temperature. The reaction mixture is stirred for 0.5 hour. (For larger batches it is advisable to pre-cool the sulfuric acid since the reaction is slightly exothermic.) The solution is poured over 300 g. of ice. The resulting suspension is extracted with chloroform. The chloroform solution is washed several times with water and dried over anhydrous magnesium sulfate. Evaporation of the solvent yields 3,4-dihydro-4-methyl-4-phenyl-6-chloro-carbostyril as a white solid, M.P. 208–210° C. The solid is recrystallized from ethyl acetate, M.P. 208.5–210° C.

*Analysis.*—Calcd. for $C_{16}H_{14}ClNO$ (percent): C, 70.71; Cl, 13.05; N, 5.16%. Found (percent): C, 70.88; Cl, 12.90; N, 4.95%.

EXAMPLE II 3,4-dihydro - 4 - methyl - 4 - phenyl-6-chloro-carbostyril (20.0 g. 0.074 mole) is suspended in 100 ml. of dry 1,2-dimethoxyethane. Sodium hydride (3.7 g., 0.074 mole, 50% suspension in mineral oil) is added and the reaction mixture is heated under reflux for 2 hrs. The solution is cooled to room temperature and 25 ml. of methyl iodide is added. The reaction mixture is stirred overnight at room temperature. The solvent is evaporated off. The residue is suspended in water and extracted with chloroform. The chloroform solution is dried over anhydrous potassium carbonate; the solvent is removed yielding about 23.0 g. of a cloudy yellow oil. The oil is crystallized from ethyl acetate giving a white solid, M.P. 123.5–127° C. The mother liquor residue is passed in ethyl acetate solution through an alumina column (100 g.). The oil thus obtained is crystallized from isopropyl alcohol, M.P. 120.5–123.5° C. The two crystalline fractions are combined and recyrstallized from ethyl acetate yielding a white crystalline material, 1,4-dimethyl-3,4-dihydro-4-phenyl-6-chloro-carbostyril, M.P. 126–128° C.

*Analysis.*—Calcd. for $C_{17}H_{16}ClNO$ (percent): C, 71.45; H, 5.64; N, 4.90. Found (percent): C, 71.50; H, 5.73; N, 4.71.

EXAMPLE III 3,4-dihydro-4-methyl-4-phenyl-6-chloro-carbostyril (16 g., .059 mole) is suspended in 200 ml. of freshly distilled monoglyme. To the suspension is added 6.60 g. (.059 mole) of potassium t-butoxide. The reaction mixture is stirred and heated under reflux for 30 min. and 30 ml. of 1-chlorobutane is then added through the condenser. The reaction mixture is stirred at room temperature for 48 hours and then heated under reflux for 24 hours. Insoluble material is removed by filtration and the solvent is evaporated in vacuo. The residue is dissolved in ethyl acetate and poured through a column containing 150 g. of alumina giving 1-butyl-3,4-dihydro-4-methyl-4-phenyl-6-chloro-carbostyril as a colorless oil which crystallizes (M.P. 79–81° C.) from ethyl acetate and n-hexane. Recrystallization from the same system raises the melting point to 80–81° C.

*Analysis.*—Calcd. for $C_{20}H_{22}ClNO$ (percent): C, 73.27; H, 6.76; N, 4.27. Found (percent): C, 73.73; H, 6.77; N, 4.39.

EXAMPLE IV 3,4-dihydro-4-methyl-4-phenyl-6-chloro-carbostyril (23 g., 0.082 mole) is suspended in 300 ml. of freshly distilled monoglyme. To the suspension is added 9.18 g. (0.082 mole) of potassium t-butoxide. The mixture is stirred for 30 min. and 18.75 g. (0.25 mole) of chloroacetonitrile is then added. The reaction mixture is stirred at room temperature for 4 days. The solvent is evaporated in vacuo. The residue is dissolved in chloroform and the solution washed with water. The organic layer is dried over anhydrous magnesium sulfate, filtered, and evaporated giving a dark brown oil which is dissolved in ethyl acetate and poured through a column containing 350 g. of alumina, giving a colorless oil, 1-cyanomethyl-3,4-dihydro-4-methyl-4-phenyl-6-chloro-carbostyril which crystallizes from ethyl acetate, M.P. 130–138° C. Recrystallization from ethyl acetate raises the melting point to 136°–138° C.

*Analysis.*—Calcd. for $C_{18}H_{15}ClN_2O$ (percent): C, 69.59; H, 4.86; N, 9.01. Found (percent): C, 69.70; H, 4.88; N, 8.86.

EXAMPLE V 3,4-dihydro-4-methyl-4-phenyl-6-chloro-carbostyril (40 g., 0.15 mole) is suspended in 250 ml. of freshly distilled monoglyme. To the suspension is added 16.5 g. (0.15 mole) of potassium t-butoxide. The reaction mixture is stirred at room temperature for 30 min. and 24.2 g. (0.16 mole) of bromobutyronitrile is then added. The reaction mixture is stirred at room temperature for 2 days. Insoluble material is removed by filtration and the solvent is evaporated in vacuo. The residue is dissolved in ethyl acetate and poured through a column containing 350 g. of alumina, giving 1-(3-cyanopropyl)-3,4-dihydro-4-methyl-4-phenyl-6-dichlorocarbostyril as a colorless oil which crystallizes (M.P. 86–95° C.) from ethyl acetate and n-hexane. Recrystallization from the same solvent system raises the melting point to 90–92° C.

*Analysis.*—Calcd. for $C_{20}H_{19}ClN_2O$ (percent): C, 70.89; H, 5.65; N, 8.26. Found (percent): C, 70.65; H, 5.56; N, 8.06.

EXAMPLE VI 1-cyanomethyl-3,4-dihydro-4-methyl-4-phenyl-6-chloro-carbostyril (11 g., 0.035 mole) is suspended in 100 ml. of anhydrous ethanol. To the suspension is added 20 ml. of Raney nickel (which has been washed several times with anhydrous ethanol) and 35 ml. of anhydrous ethanol saturated with ammonia. The reaction mixture is hydrogenated under 50 lbs. pressure in a Parr bomb for 2 hrs. The catalyst is removed by filtration and the solvent evaporated in vacuo. The residue is dissolved in methanol and ethereal hydrogen chloride is added. The resulting white crystals are removed by filtration, giving 1-(2-aminoethyl)-3,4-dihydro-4-methyl-4-phenyl-6-chlorocarbostyril hydrochloride, M.P. 140–160° C., which is recrystallized twice from methanol-ether, M.P. 238–240° C. The difference in M.P. is due to two isomorphic forms of the compound.

*Analysis.*—Calcd. for $C_{18}H_{20}Cl_2N_2O$ (percent): C, 61.54; H, 5.74; N, 7.98. Found (percent): C, 61.62; H, 5.92; N, 8.02.

EXAMPLE VII 1-(3-cyanopropyl)-3,4-dihydro-4-methyl-4-phenyl-6-chlorocarbostyril (11.50 g., 0.035 mole) is suspended in 100 ml. of absolute ethanol containing 30 g. of Raney nickel which has been washed several times with absolute ethanol. To the suspension is added 30 ml. of absolute ethanol saturated with ammonia. The reaction mixture is hydrogenated in a Parr bomb under 50 lbs. pressure for 4 hrs. The catalyst is removed gravimetrically and the solvent evaporated in vacuo. The residue, 1-(4-aminobutyl)-3,4-dihydro-4-methyl-4-phenyl-6-chloro-carbostyril, is dissolved in methanol and converted to its fumarate salt by treatment with fumaric acid to give about a 34% yield of 1-(4-aminobutyl)-3,4-dihydro-4-methyl-4-phenyl-6-chloro-carbostyril fumarate; M.P. 128–130° C.

*Analysis.*—Calcd. for $C_{24}H_{27}ClN_2O_5$ (percent): C, 62.81; H, 5.93; N, 6.10. Found (percent): C, 62.71; H, 5.92; N, 6.25.

EXAMPLE VIII 3,4-dihydro-4-methyl-4-phenyl-6-chloro-carbostyril (18 g., 0.066 mole) is suspended in 300 ml. of anhydrous toluene. To the suspension is added 3.2 g. (0.066 mole) of 50% sodium hydride in mineral oil. The reaction mixture is stirred and heated under reflux for 30 min. Dimethylaminoethyl chloride hydrochloride (47.5 g., 0.33 mole) is dissolved in water and made basic with sodium bicarbonate, extracted with toluene, dried over anhydrous magnesium sulfate, filtered, and added through the condenser. The reaction mixture is heated under reflux overnight. The reaction vessel is cooled and insolubles are removed by filtration. The solvent is evaporated in vacuo. The residue is dissolved in chloroform and extracted with 1 N hydrochloric acid several times. The combined aqueous acidic layers are made basic with 10% sodium hydroxide and extracted with chloroform. The organic layer is dried over anhydrous magnesium sulfate, filtered, and evaporated leaving a colorless oily residue which is dissolved in methanol and ethereal hydrogen chloride is added. The white crystalline product, 1-(2-dimethylaminoethyl)-3,4-dihydro-4-methyl-4-phenyl-6-chloro-carbostyril is collected by filtration (M.P. 224–227° C.). Recrystallization of the product from methanol-ether raises the M.P. to 226–228° C.

*Analysis.*—Calcd. for $C_{20}H_{23}ClN_2O \cdot HCl$ (percent): C, 63.32; H, 6.37; N, 7.38. Found (percent): C, 63.02; H, 6.30; N, 7.13.

EXAMPLE IX 3,4-dihydro-4-methyl-4-phenyl-6-chloro-carbostyril (18 g., 0.066 mole) is suspended in 150 ml. of anhydrous toluene. To the suspended is added 3.2 g. (0.066 mole) of 50% sodium hydride in mineral oil. The reaction mixture is stirred and heated under reflux for 30 min. and 26 g. (0.215 mole), of dimethylaminopropyl chloride is then added through the condenser. The reaction mixture is heated under reflux overnight. The reaction vessel is cooled and insolubles are removed by filtration. The solvent is evaporated in vacuo. The residue is dissolved in chloroform and extracted with 1 N hydrochloric acid several times. The combined aqueous acidic layers are made basic with 10% sodium hydroxide and extracted with chloroform. The organic layer is dried over anhydrous magnesium sulfate, filtered and evaporated giving a colorless oily residue of 1-(3-dimethylaminopropyl)-3,4-dihydro-4-methyl-4-phenyl-6-chlorocarbostyril. The oil is crystallized from n-hexane to give about a 32% yield of product, M.P. 71–73° C.

*Analysis.*—Calcd. for $C_{21}H_{25}ClN_2O$ (percent): C, 70.67; H, 7.06; N, 7.85. Found (percent): C, 71.00; H, 7.03; N, 7.73.

EXAMPLE X 1-cyanomethyl-3,4-dihydro-4-methyl-4-phenyl-6-chlorocarbostyril (14 g., 0.044 mole) is suspended in 100 ml. of glacial acetic acid and 30 ml. of concentrated sulfuric acid. After stirring overnight, the solution is poured over 300 g. of ice and water. The white solid which precipitates is collected by filtration and recrystallized from ethyl acetate and n-hexane, giving about a 59% yield of 1 - carbamoylmethyl - 3,4 - dihydro-4-methyl-4-phenyl-6-chlorocarbostyril; M.P. 180–182° C.

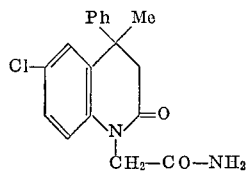

*Analysis.*—Calcd. for $C_{18}H_{17}ClN_2O_2$ (percent): C, 65.76; H, 5.21; N, 8.52. Found (percent): C, 65.68; H, 5.33; N, 8.23.

EXAMPLE XI 1-(2-aminoethyl) - 3,4 - dihydro-4-methyl-4-phenyl-6-chlorocarbostyril hydrochloride (1 g., 0.0029 mole) is dissolved in 10 ml. of water. To the solution is added 1 ml. of water containing 0.23 g. (0.0029 mole) of potassium cyanate. The reaction becomes cloudy and a white crystalline material precipitates. The reaction is stirred at room temperature for 0.5 hr. The crystalline material, 1-(2-ureidoethyl) - 3,4 - dihydro - 4-methyl-4-phenyl-6-chlorocarbostyril, is removed by filtration, about 86% yield, M.P. 170–180° C. Recrystallization from 95% ethanol raises the melting point to 188.5–190.5° C.

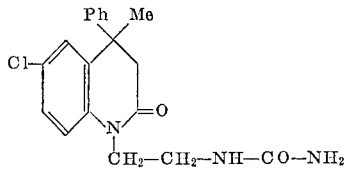

*Analysis.*—Calcd. for $C_{19}H_{20}ClN_3O_2$ (percent): N, 11.74. Found (percent): N, 11.93.

EXAMPLE XII 1-(3 - cyanopropyl) - 3,4 - dihydro-4-methyl-4-phenyl-6-chlorocarbostyril (1.75 g., 0.0051 mole) is suspended in 17 ml. of glacial acetic acid. To the suspension is added 0.74 g. (0.01 mole) of t-butanol and .98 g. (0.01 mole) of concentrated sulfuric acid. The reaction mixture is stirred at room temperature for 3 hrs. White crystalline material precipitates. The mixture is poured over 30 g. of ice water and extracted with ether several times. The combined ether layers are dried over anhydrous magnesium sulfate and evaporated in vacuo. The residue is crystallized from ethyl acetate giving about a 74% yield of 1 - [3 - (N-t-butyl-carbamoyl)-propyl] - 3,4 - dihydro-4-methyl-4-phenyl-6-chloro-carbostyril; M.P. 130–150° C. The product is recrystallized twice from ethyl acetate (M.P. 154.5–155.5° C.).

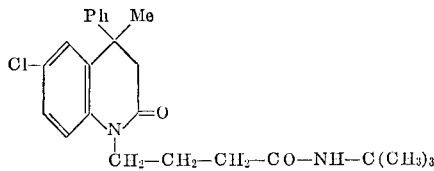

*Analysis.*—Calcd. for $C_{24}H_{29}ClN_2O_2$ (percent): C, 69.80; H, 7.08; N, 6.79. Found (percent): C, 69.50; H, 6.91; N, 6.89.

EXAMPLE XIII 3,4 - dihydro - 4-methyl-4-phenyl-6-chloro-carbostyril (0.50 g., 0.0018 mole) is suspended in 15 ml. of anhydrous monoglyme. To the suspension is added 0.21 g. (.0018 mole) of potassium t-butoxide. The reaction mixture is stirred and heated under reflux for 30 min.; the reaction vessel is cooled and 1.2 g. (0.0054 mole) of benzylbromoacetate is added through the condenser and the resulting mixture is stirred at room temperature overnight. Insolubles are removed by filtration and the solvent is evaporated in vacuo. The residue is dissolved in methylene chloride and washed with water several times. The organic layer is dried over anhydrous magnesium sulfate and evaporated leaving a colorless oily residue. The oil is crystallized from methylcyclohexane giving 1-(benzyloxy-carbonylmethyl) - 3,4 - dihydro-4-methyl-4-phenyl-6-chloro-carbostyril as a white solid, M.P. 135–145° C., about 94% yield. Recrystallization from the same solvent raises the melting point to 147–149° C.

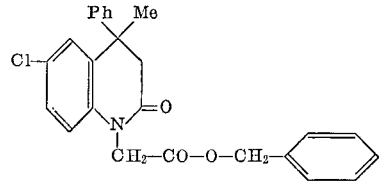

*Analysis.*—Calcd. for $C_{25}H_{22}ClNO_3$ (percent): C, 71.51; H, 5.28; N, 3.34. Found (percent): C, 71.84; H, 5.46; N, 3.48.

EXAMPLE XIV

1 - (benzyloxy-carbonyl-methyl) - 3,4-dihydro-4-methyl - 4-phenyl-6-chloro-carbostyril (16.5 g., 0.04 mole) is suspended in 150 ml. of anhydrous ethanol containing 1.5 g. of 10% palladium on carbon. The reaction mixture is hydrogenated in a Parr bomb under 50 lbs. pressure for 2 hrs. The catalyst is removed by filtration and the solvent evaporated in vacuo. The residue is dissolved in methylene chloride and extracted with 10% sodium hydroxide solution. The sodium salt of the product precipitates and is removed by filtration. The organic layer is extracted several times with 10% sodium hydroxide. The sodium salt is suspended in the combined basic layers and the suspension is made acidic with 3 N hydrochloric acid. The acidic solution is extracted with methylene chloride, dried over anhydrous magnesium sulfate, and evaporated in vacuo to give a colorless oily residue of 1-carboxymethyl-3,4 - dihydro - 4 - methyl - 4-phenyl-6-chloro-carbostyril which is crystallized from ethyl acetate, M.P. 179–181° C., about 90% yield.

*Analysis.*—Calcd. for $C_{18}H_{16}ClNO_3$ (percent): C, 65.55; H, 4.89; N, 4.24. Found (percent): C, 65.80; H, 5.02; N, 4.20.

EXAMPLE XV 3,4 - dihydro - 4-methyl-4-phenyl-6-chloro-carbostyril (12 g., 0.044 mole) is suspended in 150 ml. of freshly distilled monoglyme. To the suspension is added 2.37 g. (0.044 mole) of 50% sodium hydride in mineral oil. The reaction mixture is stirred and heated under reflux for 1 hr. Benzoyl chloride (6.3 g., 0.045 mole) is then added through the condenser and the reaction mixture is heated under reflux overnight. The reaction vessel is cooled and insolubles are removed by filtration. The solvent is evaporated in vacuo. The residue is dissolved in chloroform and washed with water. The organic layer is dried over anhydrous magnesium sulfate, filtered, and evaporated giving a colorless oily residue which is crystallized from ethyl acetate and n-hexane giving 1-benzoyl-3,4-dihydro-4 - methyl-4-phenyl-6-chloro-carbostyril as a white solid, M.P. 127–129° C.

*Analysis.*—Calcd. for $C_{23}H_{18}ClNO_2$ (percent): C, 73.49; H, 4.82; N, 3.72. Found (percent): C, 73.53; H, 5.07; N, 3.92.

EXAMPLE XVI (A) 3,4 - dihydro - 4-methyl-4-phenyl-6-choro-carbostyril (2.7 g., 0.01 mole) and 0.46 g. (0.01 mole) of 50% sodium hydride in mineral oil are suspended in 60 ml. of dry 1,2-dimethoxyethane. The mixture is heated under reflux for two hours and then cooled to room temperature. Acetyl chloride (0.9 g., 0.011 mole) in 5 ml. of 1,2-dimethoxyethane is added. The reaction mixture is stirred at room temperature for 10 min. and then under reflux for 5 min. The resulting amber suspension is filtered and the filtrate evaporated. The residue is crystallized from ether. The yellow, oily solid thus obtained is dissolved in methylcyclohexane and allowed to crystallize slowly. The solid (shown to be starting material) is removed by filtration and the mother liquors are concentrated. The product, 1-acetyl-3,4-dihydro-4-methyl-4-phenyl-6-chloro-carbostyril crystallizes upon standing and is isolated by filtration. A recrystallization from methylcyclohexane gives a white solid, M.P. 73.5–75° C.

(B) The procedure of Example XVI(A) is repeated except that an equivalent quantity of propionyl chloride, furoyl chloride and thenoyl chloride, respectively, is used in place of the acetyl chloride used therein to yield, as respective products, the corresponding 1-propionyl, 1-furoyl and 1-thenoyl derivatives of 3,4-dihydro-4-methyl-4-phenyl-6-chloro-carbostyril.

EXAMPLE XVII

β-methylcinnamic acid (47 g., 0.29 mole) is suspended in 50 ml. of benzene. Thionyl chloride (36 g., 0.30 mole) is added and the reaction mixture is heated in an oil bath at 50° C. for 1.5 hrs. with stirring. (Caution: higher temperatures cause extensive decomposition.) The solvent is removed under reduced pressure and the resulting amber colored β-methyl cinnamoyl chloride is used in the next step without further purification. p-Chloroaniline is recrystallized from benzene-methyl-cyclohexane and a 44 g. (0.35 mole) sample is suspended in 200 ml. of methylene chloride. A solution of potassium hydroxide (22.9 g., 0.41 mole, in 300 ml. of water) is added. The two-phase reaction mixture is cooled in an ice-bath and a solution of the above prepared β-methyl cinnamoyl chloride in 50 ml. of methylene chloride is added over a period of 10 min. with vigorous stirring. The reaction mixture is stirred for an additional 10 min. at room temperature. The water layer is extracted with methylene chloride and the combined methylene chloride solutions are washed with 1N hydrochloric acid and water. The solution is dried over anhydrous magnesium sulfate and the solvent is removed. The residue crystallizes giving a yellow solid, M.P. 115–131° C. Two recrystallizations from benzene give a white solid, 4' - chloro - β-methyl-cinnamanilide, M.P. 129.5–132.5° C.

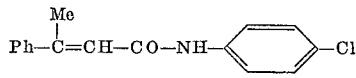

*Analysis.*—Calcd. for $C_{16}H_{14}ClNO$ (percent): C, 70.71; H, 5.19; N, 5.16. Found (percent): C, 70.94; H, 5.29; N, 5.02.

What is claimed is:
1. 4'-chloro-β-methyl-cinnamanilide.

References Cited
UNITED STATES PATENTS
2,704,762  8/1953  Hendall _____ 260—558

HENRY R. JILES, Primary Examiner
H. I. MOATZ, Assistant Examiner

U.S. Cl. X.R.
260—287 R, 288 R, 288 A, 289 R; 424—258